US009967621B2

(12) United States Patent
Armstrong et al.

(10) Patent No.: US 9,967,621 B2
(45) Date of Patent: May 8, 2018

(54) DYNAMIC PERSONALIZED PROGRAM CONTENT

(75) Inventors: Trevor C. Armstrong, Renton, WA (US); David J. Jurenka, Kirkland, WA (US); Jeanie Michelle DuMont, Kirkland, WA (US); Michael L. Christian, Snohomish, WA (US); Todd Gordon Stevens, Sammamish, WA (US); Vernon W. Hui, Bellevue, WA (US); Ashish Gupta, Bothell, WA (US); David W. Stevens, Bothell, WA (US); Adam Lee Potratz, Medina, WA (US); Langdon Ward Beeck, Redmond, WA (US)

(73) Assignee: Rovi Technologies Corporation, San Jose, CA (US)

( * ) Notice: Subject to any disclaimer, the term of this patent is extended or adjusted under 35 U.S.C. 154(b) by 0 days. days.

(21) Appl. No.: 13/326,960

(22) Filed: Dec. 15, 2011

(65) Prior Publication Data

US 2013/0160051 A1    Jun. 20, 2013

(51) Int. Cl.
| | |
|---|---|
| *H04N 21/454* | (2011.01) |
| *H04N 21/854* | (2011.01) |
| *H04N 21/466* | (2011.01) |
| *H04N 21/462* | (2011.01) |
| *H04N 21/84* | (2011.01) |
| *G11B 27/10* | (2006.01) |

(52) U.S. Cl.
CPC ......... *H04N 21/454* (2013.01); *G11B 27/105* (2013.01); *H04N 21/462* (2013.01); *H04N 21/466* (2013.01); *H04N 21/84* (2013.01); *H04N 21/854* (2013.01)

(58) Field of Classification Search
CPC ............ H04N 21/854; H04N 21/8549; H04N 21/8133; H04N 21/252; H04N 21/4331; H04N 21/25891; H04N 21/6125; H04N 21/2387; H04N 21/6587; H04N 21/4532; H04N 21/47202; H04N 21/4622; H04N 21/4755; H04N 21/454; H04N 21/462; H04N 21/84; H04N 21/466; G11B 27/105
USPC ....................................... 725/32–36, 46, 41
See application file for complete search history.

(56) References Cited

U.S. PATENT DOCUMENTS

| | | |
|---|---|---|
| RE32,632 E | 3/1988 | Atkinson |
| RE34,340 E | 8/1993 | Freeman |

(Continued)

OTHER PUBLICATIONS

Lists> What's on Tonite! TV Listings (fwd), Internet article (On line), Jan. 28, 1995, XP 002378869 Retrieved from the Internet: URL: www.scout.wisc.edu/Projects/PastProjects/NH/95-01-31/0018.html> [Retrieved on Apr. 28, 2006]. The whole document, 4 pages.

(Continued)

*Primary Examiner* — Benjamin R Bruckart
*Assistant Examiner* — Aklil M Tesfaye
(74) *Attorney, Agent, or Firm* — Haley Guiliano LLP (57) ABSTRACT

Described is a technology by which personalization data is used to select and order video highlight clips for a personalized highlight reel that a user may play to view, such as part of a narrative arranged for that user. The narrative may include introductory content, transition content and/or ending content. The narrative may include advertising content and/or ending content. The narrative may be rearranged in response to an event.

20 Claims, 4 Drawing Sheets

(56) References Cited

U.S. PATENT DOCUMENTS

| | | | |
|---|---|---|---|
| 5,912,696 | A | 6/1999 | Buehl |
| RE36,801 | E | 8/2000 | Logan et al. |
| RE37,881 | E | 10/2002 | Haines |
| 6,496,981 | B1 | 12/2002 | Wistendahl et al. |
| 6,665,870 | B1* | 12/2003 | Finseth et al. ................. 725/40 |
| 7,836,475 | B2* | 11/2010 | Angiolillo et al. ............. 725/93 |
| 7,996,878 | B1* | 8/2011 | Basso et al. .................. 725/135 |
| 8,028,315 | B1* | 9/2011 | Barber ............... H04N 21/4334 463/42 |
| 8,448,206 | B2* | 5/2013 | Roberts et al. ................. 725/40 |
| 2002/0144268 | A1* | 10/2002 | Khoo et al. ..................... 725/47 |
| 2003/0044162 | A1* | 3/2003 | Angel ............................ 386/55 |
| 2003/0189589 | A1* | 10/2003 | LeBlanc ............. G11B 27/031 715/723 |
| 2005/0172318 | A1* | 8/2005 | Dudkiewicz et al. .......... 725/46 |
| 2008/0060001 | A1* | 3/2008 | Logan .................... G06Q 30/06 725/34 |
| 2008/0066111 | A1* | 3/2008 | Ellis et al. ...................... 725/57 |
| 2008/0086747 | A1* | 4/2008 | Rasanen et al. ................ 725/46 |
| 2008/0155421 | A1* | 6/2008 | Ubillos et al. ................ 715/724 |
| 2008/0155616 | A1* | 6/2008 | Logan et al. .................... 725/93 |
| 2008/0306925 | A1* | 12/2008 | Campbell et al. ................ 707/4 |
| 2009/0199230 | A1* | 8/2009 | Kumar et al. .................. 725/32 |
| 2009/0282337 | A1* | 11/2009 | Tilley ............... G06F 17/30781 715/719 |
| 2010/0115413 | A1 | 5/2010 | Schein et al. |
| 2010/0115541 | A1 | 5/2010 | Schein et al. |
| 2010/0122286 | A1* | 5/2010 | Begeja et al. .................. 725/34 |
| 2010/0146543 | A1 | 6/2010 | Knee et al. |
| 2010/0153856 | A1* | 6/2010 | Russ ............................ 715/753 |
| 2010/0175078 | A1 | 7/2010 | Knudson et al. |
| 2010/0211969 | A1 | 8/2010 | Schein et al. |
| 2010/0211975 | A1 | 8/2010 | Boyer et al. |
| 2010/0247065 | A1 | 9/2010 | Cooper et al. |
| 2010/0275230 | A1 | 10/2010 | Yuen et al. |
| 2010/0299692 | A1 | 11/2010 | Rao et al. |
| 2010/0319013 | A1 | 12/2010 | Knudson et al. |
| 2010/0332560 | A1* | 12/2010 | Gerbasi, III ......... G11B 27/034 707/812 |
| 2011/0013885 | A1 | 1/2011 | Wong et al. |
| 2011/0035771 | A1 | 2/2011 | Ward, III et al. |
| 2011/0064387 | A1* | 3/2011 | Mendeloff et al. ........... 386/262 |
| 2011/0131601 | A1 | 6/2011 | Alten et al. |
| 2011/0167451 | A1 | 7/2011 | Yuen et al. |
| 2011/0173660 | A1 | 7/2011 | Schein et al. |
| 2011/0185387 | A1 | 7/2011 | Schein et al. |
| 2011/0209170 | A1 | 8/2011 | Schein et al. |
| 2011/0258663 | A1 | 10/2011 | Lemmons et al. |
| 2011/0265124 | A1 | 10/2011 | Goldenberg et al. |
| 2011/0276995 | A1 | 11/2011 | Alten et al. |
| 2012/0079539 | A1 | 3/2012 | Schein et al. |
| 2012/0102523 | A1 | 4/2012 | Herz et al. |
| 2012/0185901 | A1 | 7/2012 | Macrae et al. |
| 2012/0189284 | A1* | 7/2012 | Morrison et al. ............. 386/282 |
| 2012/0198338 | A1* | 8/2012 | Flint .................... G11B 27/034 715/726 |
| 2012/0272270 | A1 | 10/2012 | Boyer et al. |
| 2012/0304211 | A1 | 11/2012 | Berezowski et al. |
| 2013/0031582 | A1 | 1/2013 | Tinsman et al. |
| 2013/0073384 | A1* | 3/2013 | Qiu ........................... 705/14.49 |
| 2013/0160051 | A1 | 6/2013 | Armstrong et al. |
| 2013/0304586 | A1 | 11/2013 | Angles et al. |

OTHER PUBLICATIONS

Little et al., "Prospects for Interactive Video-on-Demand," IEEE Multimedia, Fall 1994, pp. 14-24.

Lloyd, "Impact of Technology," Financial Times, Jul. 1978, 2 pages.

Loen et al., "Subscriber Terminal Units for Video Dial Tone Systems," IEEE Network, Sep./Oct. 1995, 10 pages.

Lowenstein, R.L. and Aller, H.E., "The Inevitable March of Videotex," Technology Review, vol. 88, Oct. 1985, p. 22.

IPG Attitude and Usage Study, prepared by Lieberman Research Worldwide for Gemstar-TV Guide International, Oct. 2002.

Lynch, Keith, timeline of net related terms and concepts, Mar. 22, 2007, 8 pages.

M/A-COM, Inc., "Videocipher II Satellite Descrambler Owner's Manual," dated Prior Feb. 1986, pqs. 1-17.

Mack Daily, "Addressable Decoder with Downloadable Operation," Proceedings from the Eleven Technical Sessions, 42nd Annual Convention and Exposition of the NCTA, Jun. 6-9, 1993, pp. 82-89.

Make Room for POP, Popular Science, Jun. 1993, 5 pages.

Prevue Networks and OpenTV(R) Agree to Work Together on Deploying Interactive Program Guides Worldwide, from the internet at http://www.opentv.com/news/prevuefinal.htm, printed on Jun. 28, 1999, 2 pages.

Prevue Networks, Inc. Promotional Materials, 1994, 22 pages.

Prevue Online Debuts Local Listings for 250 Systems; System-Specific Listings Include Multimedia Features—Free Build Acceleration, PR Newswire, Jun. 5, 1997.

Prevue Online, Dec. 28, 1996, extract from web.archive.org, printed on Nov. 18, 2014, http://www.prevue.com.

Probe XL Brochure, Auto Tote Systems Inc., (Newark, Delaware) (undated) 57 pages.

Prodigy Launches Interactive TV Listing, Apr. 22, 1994, Public Broadcasting Report, 1 page.

PTV Recorder Setup Guide, Philips Electronics, TiVo Inc. (2000), 68 pages.

Public Final Initial Determination on Violation filed Jul. 2, 2013, 371 pages.

Qayyum, "Using IVDS and VBI for Interactive Television," IEEE, Jun. 10, 1996, 11 pages.

Rajapakshe et al., "Video on demand," (last modified Jun. 1995) <http://www-dse.doc.ic.ac.uk/~nd/suprise_95 /Journal/vo14/shr/report.html>, 14 pages.

\* cited by examiner

DYNAMIC PERSONALIZED PROGRAM CONTENT

BACKGROUND

There is a great deal of program content available from television networks and other sources. On a television set top box or the like, users receive and may be able to record pre-programmed, manually produced television shows. Often the user is not interested in the entire content of each show, and thus has to fast forward through uninteresting content. Sometimes in order to find desired content, such as a particular highlight, a user has to look for the content by fast forwarding through multiple recorded shows, or possibly waiting during a live show until the content can be viewed.

On the web, to find desired content, users have to hunt around for a video clip that they think contains desired content, and similarly play/fast forward through that clip. Again, to find something specific, a user often needs to click through multiple video clips.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which personalization data is used to determine a set of video clips, based upon the personalization data and metadata associated with the video clips. The video clips of the set are ordered into a catalog based upon the personalization data and at least some of the metadata. The video clips may be integrated with other content into a narrative presentation. In one aspect, the other content includes transition content, which upon playing of the narrative is played before at least one video clip, and/or an advertisement that upon playing of the narrative is played in association with at least one video clip.

In one aspect, a content scoring component determines scores for a set of personalized video clips that are selected based upon at least some personalization data. A sorting component orders the video clips based upon their scores, and a mechanism arranges the video clips and other content into a narrative for playing. The content scoring component may further determine the scores based upon one or more criteria including at least one of popularity data, user behavior history data or state data. A filter set, comprising filters and/or a querying mechanism, may be used to determine the set of personalized video clips from a larger set of available video clips.

In one aspect, information corresponding to a set of video clips is ordered into a catalog based upon personalization data. The catalog is arranged into a narrative based upon the ordering, including adding at least some other content to the narrative. At least part of the narrative is played, including playing at least one of the video clips. The narrative may be dynamically rearranged based upon an event.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically providing personalized content for a user. In one aspect, a user's personalization data is stored and used (along with possibly other criteria) to drive queries for program content. A video player application may organize and display the program content in a series of video clips, sometimes referred to as a highlight reel or highlights reel, including playing each video clip in succession as a narrative. The clips may be played in association with other content, such as "programmed" video bumpers, transition content, advertisements and/or other effects. The application may be configured to tweak, filter, or sort the personalization data to dynamically re-present a modified highlights reel, such as by performing real-time reorganization, sorting, and querying for content to present to the user.

It should be understood that any of the examples herein are non-limiting. For example, the technology may work with audio, and may use any computing devices such as a gaming systems, personal computers, digital video recorders (DVRs), set-top boxes, smartphones and/or tablets. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in content presentation in general.

Figure 1:
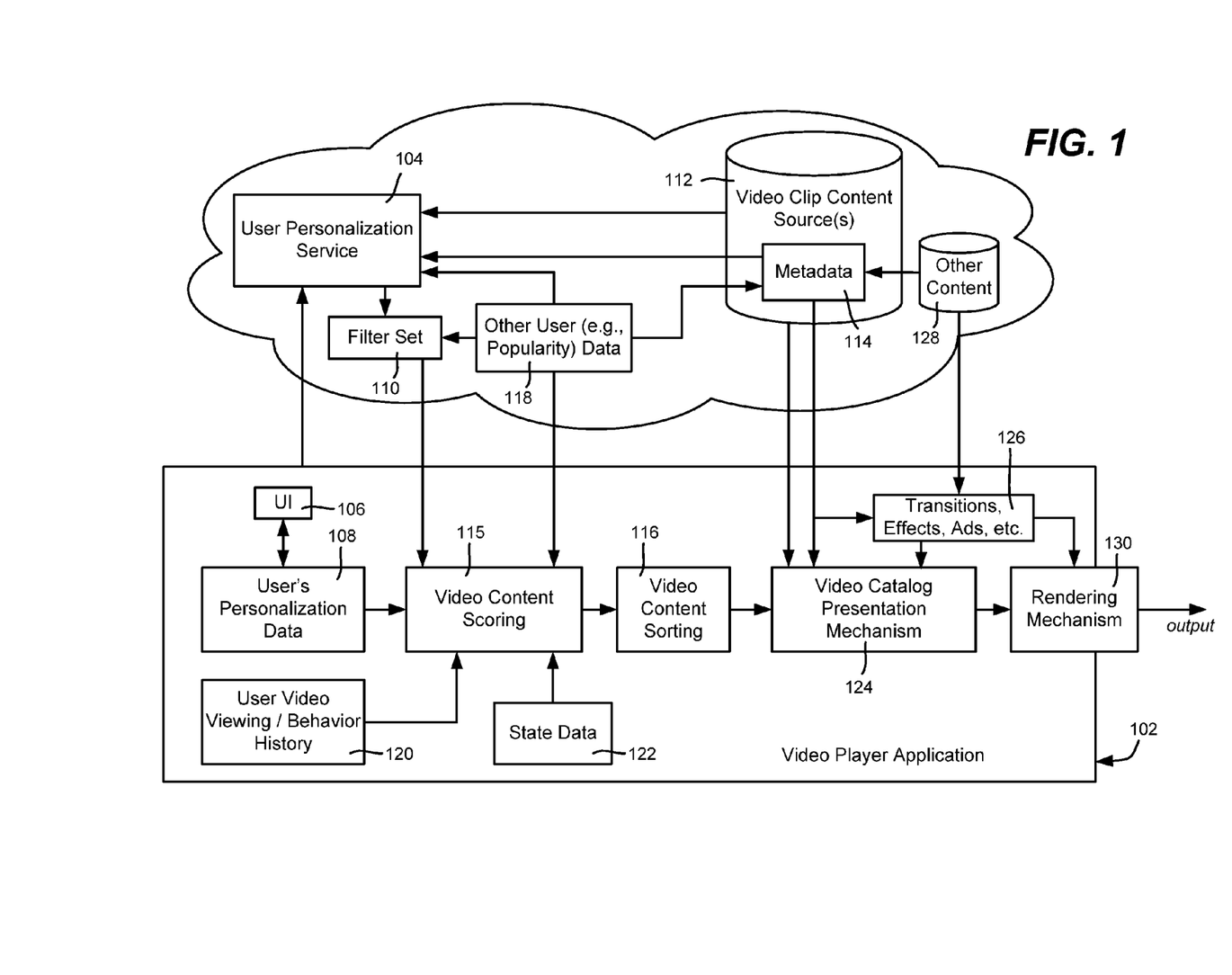
FIG. 1 is a block diagram showing example components of a system that provides a dynamic and personalized programming content to a user according to one example embodiment.

FIG. 1 shows a block diagram comprising example components in one implementation, in which a video player application 102 communicates with a user personalization service 104 in order to provide personalized program content for a user. As represented in FIG. 1, the user personalization service 104 is located in a remote network location or set of locations (e.g., the "cloud") relative to the video player application 102, which for example may reside on one or more of a user's local computing devices, such as a gaming console and smartphone.

As will be understood, having the service 104 in the cloud allows any user's personalized information (as well as the program content and metadata) to be accessed from different platforms and devices. However, as will be understood, any of the components and/or data described herein may be remote relative to the device on which the content is viewed, or alternatively, at least some components that are represented as remote in FIG. 1 may be local. Further, any components that are exemplified may be divided into sub-components, some or all of which may be remotely located, locally located, or split between local and remote, and/or other components shown may be combined into a lesser number of components.

In the example implementation of FIG. 1, the video player application 102 includes a mechanism (e.g., a user interface, or UI 106) for receiving and maintaining a user's personalization data 108 in a suitable storage, e.g., local storage on a device and/or in the cloud such as part of the personalization service 104 for access by any device. For example, for a personalized sports highlight reel, the UI 106 may present the user with a menu of choices or the like to identify a customized set of elements including the user's favorite shows, sport categories, leagues, and teams. Depending on a given implementation, virtually any set of information may be collected, including dislikes. The user may personalize and order these elements in the manner that the user considers most relevant. The user also may share the personalization data 108, e.g., with a friend, group or set of followers (e.g., blog readers) having common interests.

Based upon the user's personalization data 108, e.g., which may be in the form of a list, the application may create a set (e.g., a series) of one or more filters, such as one for each item in the personalization data 108. The filter set 110, which in FIG. 1 is exemplified as being in the cloud (but may in be local in whole or in part), may be used to narrow the amount of available content to only content in which the user is likely interested. In general, each video clip in one or more content sources 112 from which the clips are obtained is associated with metadata 114 that describes or otherwise fits with that clip, and the filter set 110 uses this information to select a subset of relevant content for the user. Note that metadata 114 may be directly associated with a clip, such as entered by the creator of the clip, or may be indirectly obtained from other sources, e.g., sports scores, other feeds and sources, other metadata, user popularity data and so forth.

Time is one filtering criterion, e.g., only clips that are newer than forty-eight hours old or some other timeframe may be considered for the reel. Other filtering criterion also may be applied at this stage; for example, as indicated within the user's personalization data 108, a user may be interested in professional football but not college football, and thus from among the video clips identified via their metadata as containing football video, the filter set 110 eliminates video clips containing college football, and so on with other non-desirable clips.

In one implementation, after filtering, the result is a set of clips (such as a list) in which the user is likely interested. As described below, a scoring mechanism 115 and sorting mechanism 116 (which may be the same component) computes a score for each clip and ranks the clips according to the score, respectively. For example, based in part on the metadata, clips of user-selected favorite teams and newer clips may be given more weight and thus trend toward the head of the playback queue. Weights used in scoring may be manually set, learned via machine learning, tuned based upon feedback, and so forth.

Also shown in FIG. 1 is other user data 118 may be collected, such as reflecting the popularity of a clip as determined from a large number of users. This may factor into filtering, as general popularity may be specified by default or by user preference as being acceptable for inclusion of a clip. For example, a user ordinarily may not prefer to see everyday basketball highlights, but may enjoy seeing a spectacular game winning shot that others have indicated (e.g., via web downloads) is extremely popular. Thus, such a clip is not filtered out. Further, popularity may be used another factor in scoring weight.

Another possible factor in scoring that is exemplified in FIG. 1 is the user's video viewing/behavior history 120. For example, if a user has in the past regularly interacted with the video player application 102 so as to skip over a particular topic such as stock market news, then it is likely that the user is less interested in stock market news. Thus, such history information may be used to lower the weight of clips containing stock market news according to their metadata. Note that FIG. 1 shows the history 120 as being loaded into the video player application 102, but this data may be stored in the cloud or in any storage coupled to the video player application.

History 120 may also be used for other considerations, and may be obtained from other sources. For example, if a user regularly watches a particular show involving a certain celebrity, the user may be asked whether he or she would like to modify the personalization data 108 to include news stories regarding that celebrity with respect to clip selection and/or filtering. The adjustment may be automatic to an extent, e.g., a user may have been watching golf a significant amount of time recently, and thus the filtering and/or scoring may be automatically adjusted to include some golf highlights even if the user's personalization data 108 did not explicitly mention golf. If the user then tends to view (rather than skip over) golf highlights in the reel, the scoring may go up to include more golf and/or weight golf higher over time relative to highlights the user does skip over.

Still another factor in scoring may be state data 122. As described above, state data in the form of the current time is one such factor, e.g., older clips (those remaining after the example forty-eight hour filtering) may be given less weight in scoring than newer clips. Another such factor represented in the state data 122 may be game results. For example, when combined with the history 120, the application 102 may learn that the user skips over video highlight clips of his favorite team whenever his team lost its game, and skips ahead to any such clips when they win. Thus, as one example, the weight given to a video highlight clip may be adjusted based upon whether the user's team won and/or lost the game with which the clip is associated. Note that FIG. 1 shows the state data 122 as being loaded into the video player application 102, but this data may be stored in the cloud or in any storage coupled to the video player application.

As can be readily appreciated, numerous other factors may be used in scoring. The device being used to display the highlight reel (e.g., whether the device is a smartphone with a small screen versus a set-top box coupled to a high definition television) may be one such factor. Such factors and relative weights may be machine learned for many users, for example, and adjusted for a user's particular viewing history.

Following scoring and sorting, a sorted playlist catalog is assembled for the user. The catalog may be limited to a certain total duration, by default or if desired by the user, or by some other criterion such as a total number of clips. The catalog may be a separate data structure (e.g., a list or the like) that gets integrated into a narrative comprising the video clips and other content, or may be directly built into a data structure that contains the narrative, e.g., identifying the clips and other content to play in association with those clips.

A video catalog presentation mechanism 124 plays the clips according to the catalog, whereby the user sees what is (to a very high likelihood) desirable personalized content in the form of a highlight reel. Note however that the catalog may be dynamically reconfigured/rearranged as described below.

As represented in FIG. 1, the highlight reel may contain other content 126 separate from the set of clips, including transitions, video bumpers, advertisements, and other effects and/or the like, including from a source 128 of the other content 126, thereby allowing a rendering mechanism 130 to provide output in the form of a more storytelling-like narrative, for example; (note that the video catalog presentation mechanism 124 and/or the rendering mechanism 130 individually or together can be considered the mechanism that arranges the narrative). Such transitions may appear between highlight clips, for example. Other effects (e.g., including video, graphics and/or animations with accompanying audio) may be inserted into and/or superimposed over/around the video clips, and so forth, e.g., in time order and/or in screen area appearance. For example, an introduction may precede the playing of the first clip, such as if a network provided the set of clips from among its highlights and thus presents an opening clip identifying that network, setting forth a copyright notice, and so forth. Transitions may be shown between highlight clips, and a closing clip and/or other effect may end the highlight reel. Advertisements may appear as part of the overall experience, as may other features, such as a scrolling text ticker or the like related to current events.

Via the metadata 114, the transitions, effects and other content insertions such as advertisements may be selected for relevance to the current clip or clips before and after the effect/content insertion. For example, a transition from a current news story to a story about a celebrity may include an image of that celebrity and text to indicate that a highlight video regarding that celebrity is upcoming. An advertisement related to buying a particular sports team's merchandise may follow (or accompany) a highlight reel containing a big win for that sports team, for example. As another example, a transition for an upcoming sports video clip may include metadata-based information, such as a title, score of the game, team statistics, standings, key player statistics and so forth. In one alternative, the user may personalize transitions and/or other effects by specifying certain statistics to view, e.g., related to the user's fantasy sports team.

In one implementation, the catalog may be dynamically configured or reconfigured at any time, such as while one clip is playing. For example, a new clip may become available while another clip is playing, causing the catalog to be reconfigured (or a new catalog to be built); clips in the reconfigured catalog that have already been played may be marked as such to avoid replaying them unless requested by the user. Other content in the narrative may also change (or be changed instead of the catalog); as used herein, the term "rearranging" with respect to the narrative includes reconfiguring any or all of the catalog and/or changing any or all of the other content.

Dynamic reconfiguration or rebuilding, as well as other effects, may occur in response to an event, such as time, existence of a new clip, user interaction, new state data, a breaking news story, and so forth. For example, user interaction with a currently displayed score in a text ticker may add a highlight clip (that is otherwise not there) to the catalog, or change an effect such as split screen or picture-in-picture to show that clip without necessarily changing the catalog. Interaction may be via a controller, voice, gesture, touch, and/or the like depending on what input mechanisms are available. A device may be complemented by a companion device, e.g., a smartphone may be used to help select content shown on a high-definition television set.

Note however that reconfiguration may not occur if the user is able to choose to use the catalog in an offline mode, e.g., to buffer the content while in Wi-Fi range or while connected to a high bandwidth source, such as to avoid paying for data charges/waiting for slower networks. Also, a user also may share or save a highlight reel, in which event the catalog is persisted at the time of sharing/saving; note that the transitions may or may not be persisted, e.g., some or all new transitions and/or effects may appear upon the replaying of a saved or shared reel, such as more current information if available.

Further, in one implementation the video player application components are arranged in a pipeline type arrangement. This allows the video player application to be extended with one or more other components, a component may be replaced, updated and so forth without necessarily changing any of the other components. By way of example, consider a component that senses a user's emotional reaction to a viewed game or other clip; the scoring component may be updated to accept such reaction data in computing the scores.

Figure 2:
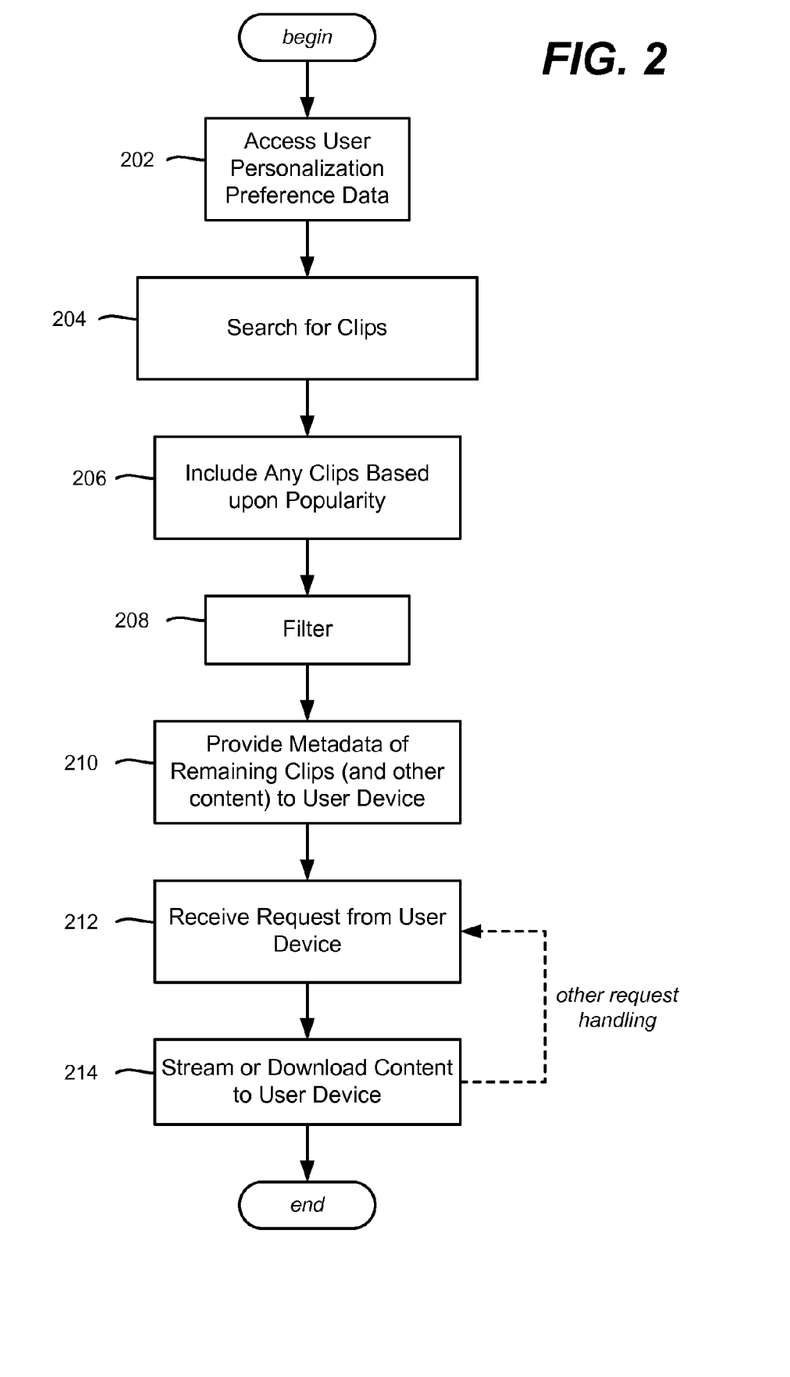
FIG. 2 is a flow diagram representing example steps that may be taken to provide personalized programming content for a user according to one example embodiment.

FIG. 2 summarizes via a flow diagram some example steps taken with respect to obtaining personalized clips for a user, beginning at step 202 where a user's personalization data is accessed. Step 204 queries/searches for clips; the search itself may perform some filtering, such as by using personalization data and metadata to include or exclude certain clips from the set. Thus, as used herein, "querying" and its derivatives (e.g., "query" and "queried") includes concepts related to "filtering" and its derivatives (and vice-versa), as a query itself can be selective. Step 206 adds any clips based upon popularity, for example.

Step 208 represents any further filtering, if all filtering is not performed during querying. For example, the querying at step 204 may be relatively general filtering to find as many clips as possible that may be relevant, with the further filtering at step 208 being a more fine-grained filtering, including to possibly remove any clips added because of popularity. Querying may be inclusive in nature, with subsequent filtering being exclusive, or vice-versa. In general, the querying and/or any subsequent filtering operations provide a more manageable set for scoring, e.g., instead of scoring many thousands of clips that may be found, querying and/or filtering may reduce the set to a subset of a few dozen, which then may be efficiently scored and ranked.

Step 210 represents providing the metadata associated with each of the clips that remain after filtering. As can be readily appreciated, this metadata is used as factors in the scoring. Note that in this example, scoring and sorting are performed at the user device, and thus step 210 provides the metadata to the user device; however as described above the scoring may be performed remotely, (whereby scoring and sorting generally occur where step 210 is performed).

Step 212 represents receiving a request from the user device for the content (clips and other content such as transitions) to play. Depending on the type of request, the clips and other content may be streamed as requested to a device buffer, or downloaded for offline use, for example, as represented by step 214. The dashed line from step 214 to step 212 represents ongoing communication as needed for additional content downloading/streaming.

Figure 3:
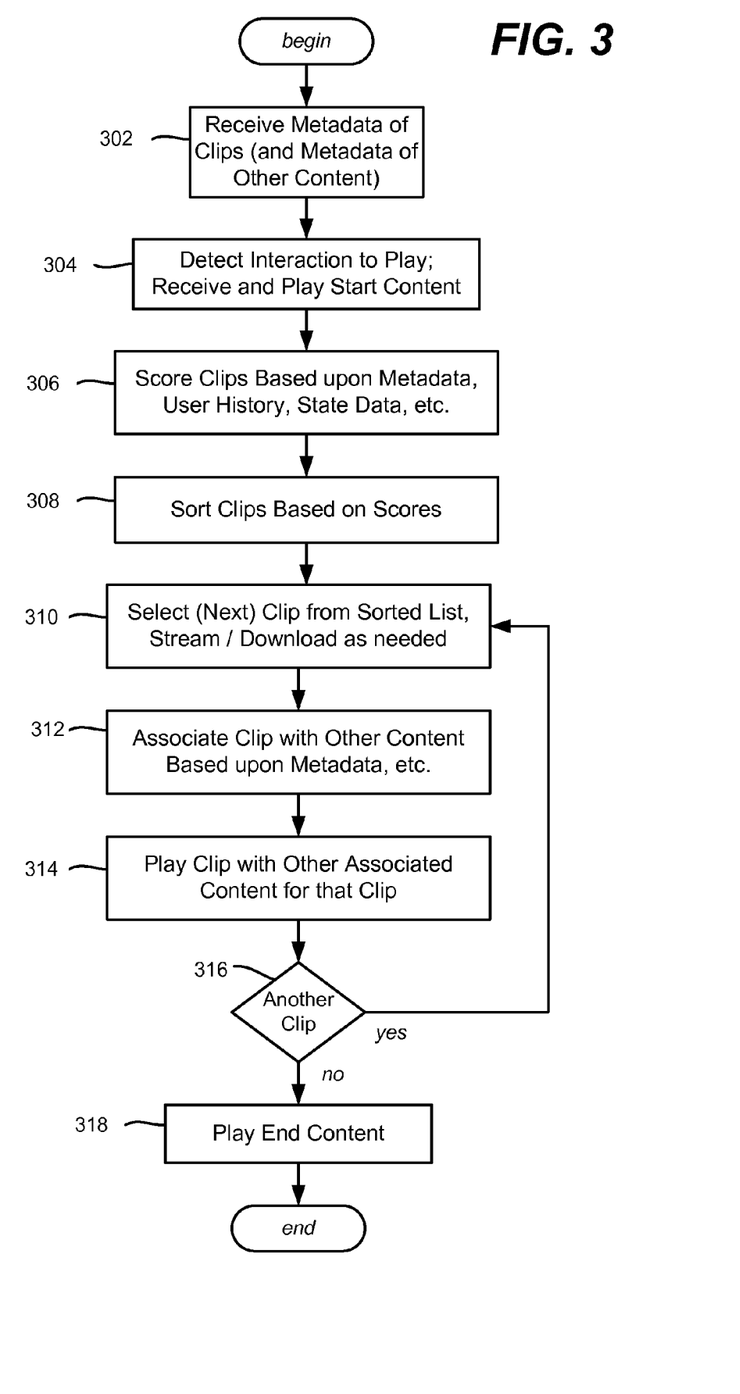
FIG. 3 is a flow diagram representing example steps that may be taken to arrange personalized programming content for a user into a narrative according to one example embodiment.

FIG. 3 represents a flow diagram showing example steps at a user device, (notwithstanding that some of these steps alternatively may be performed remotely). Step 302 represents receiving the metadata for the clips and other content, such as corresponding to step 210 of FIG. 2. Step 304 represents detection interaction to start the playing, and receiving and playing the starting content, such as comprising an introduction video, text, graphics and/or animation, which begins the playing of the highlight reel. Steps 306 and 308 represent the scoring and sorting operations, which may occur separately or at the same time (e.g., the catalog may be modified as each score is computed).

Step 310 represents the selection of a highlight video clip to play, starting with the first clip on the list. Streaming or downloading may begin for the first clip and for any clip-dependent associated content once the clip is known; additional content may be streamed/downloaded in anticipation of being needed so as to avoid perceived playback delay. Step 312 thus determines and receives what other content (e.g., transition, advertisement and/or the like) is associated with that content; note that other content played before the clip may be downloaded/streamed before the clip itself. Step 314 plays the clip and the other content; note that the clip may not be played until after some or all of the other associated content, such as a transition has played, and that other content may be played along with the clip, and/or follow the clip. Step 316 repeats the process for each other clip. When the various clips and associated content have been played, end content (not necessarily clip-dependent) may be played (step 318), such as an advertisement, goodbye message and so forth.

Although not explicitly shown in FIG. 3, it is understood that user interaction may occur at any time, including during playing of the content. Typical interaction includes fast forwarding, rewinding, pausing, skipping and so forth. Skipping/fast forwarding of certain content such as copyright notices may be disallowed. Other interaction may be to select another clip, for example, such as available via thumbnails visible via a footer or the like. A user may interact to share a particular clip, e.g., as a recommendation to their friend, or also may have new clips inserted into the user's highlight reel due to one or more recommendations from friends or the like. Note that if a user interacts in some way that he or she likes or dislikes a particular clip, this may influence the later highlight reel. Thus, as described above, reconfiguration of the catalog may occur as a result of an event. In general, unless user interaction triggered the reconfiguration, the reconfiguration allows the currently playing clip (and possibly any of its related other content) to complete, whereby the user does not notice the reconfiguration, and seamlessly sees the narrative presentation as if the catalog was initially configured that way. Note however that the upcoming playlist may be modified with content insertion and indicators, e.g., while watching the highlight reel and something new arrives, the content enters into the queue and may be accompanied by a visible indicator that indicates that the system is adding to the experience with something new coming up.

Exemplary Operating Environment

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

Figure 4:
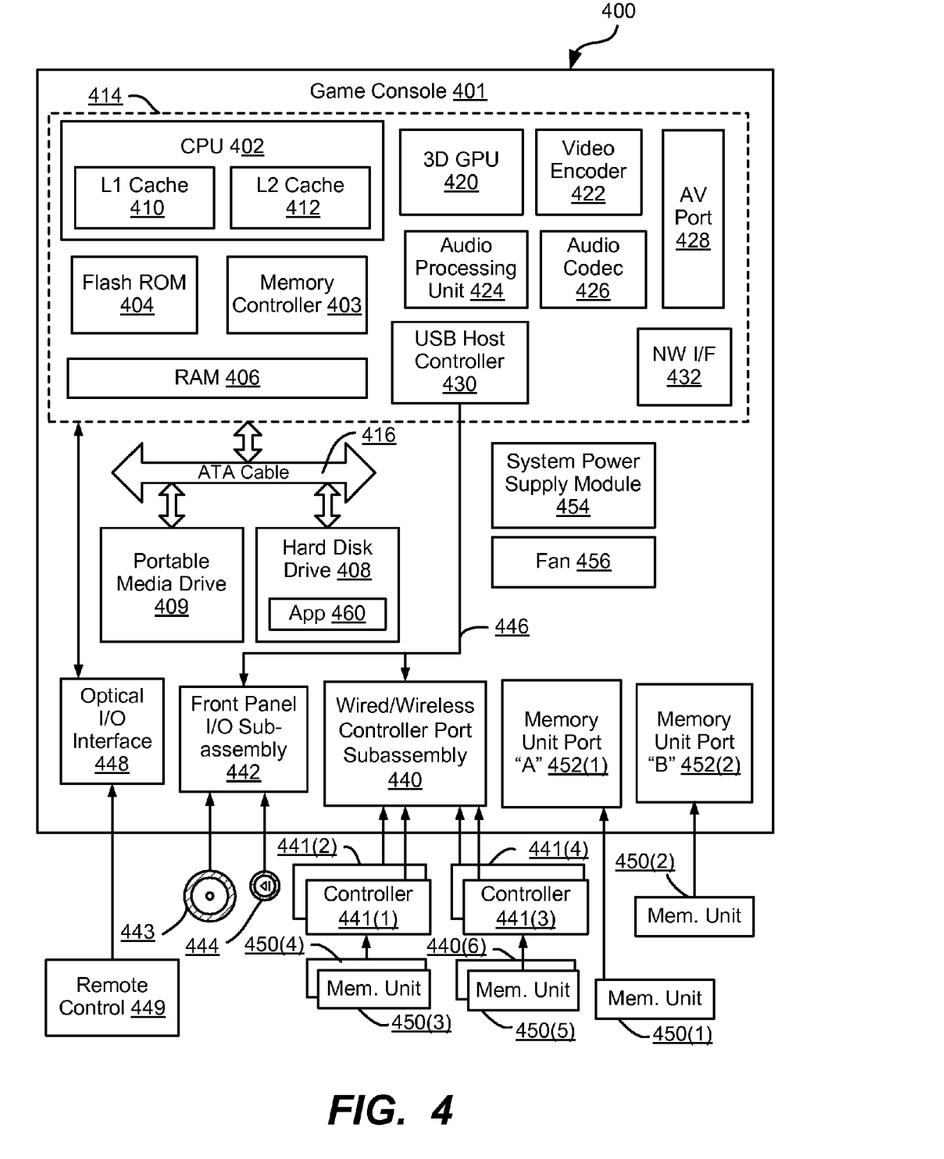
FIG. 4 is a block diagram representing an exemplary computing environment, in the form of a gaming system, into which aspects of the subject matter described herein may be incorporated.

FIG. 4 is a functional block diagram of gaming and media system 400 and shows functional components in more detail. Console 401 has a central processing unit (CPU) 402, and a memory controller 403 that facilitates processor access to various types of memory, including a flash Read Only Memory (ROM) 404, a Random Access Memory (RAM) 406, a hard disk drive 408, and portable media drive 409. In one implementation, the CPU 402 includes a level 1 cache 410, and a level 2 cache 412 to temporarily store data and hence reduce the number of memory access cycles made to the hard drive, thereby improving processing speed and throughput.

The CPU 402, the memory controller 403, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 402, the memory controller 403, the ROM 404, and the RAM 406 are integrated onto a common module 414. In this implementation, the ROM 404 is configured as a flash ROM that is connected to the memory controller 403 via a Peripheral Component Interconnect (PCI) bus or the like and a ROM bus or the like (neither of which are shown). The RAM 406 may be configured as multiple Double Data Rate Synchronous Dynamic RAM (DDR SDRAM) modules that are independently controlled by the memory controller 403 via separate buses (not shown). The hard disk drive 408 and the portable media drive 409 are shown connected to the memory controller 403 via the PCI bus and an AT Attachment (ATA) bus 416. However, in other implementations, dedicated data bus structures of different types can also be applied in the alternative.

A three-dimensional graphics processing unit 420 and a video encoder 422 form a video processing pipeline for high speed and high resolution (e.g., High Definition) graphics processing. Data are carried from the graphics processing unit 420 to the video encoder 422 via a digital video bus (not shown). An audio processing unit 424 and an audio codec (coder/decoder) 426 form a corresponding audio processing pipeline for multi-channel audio processing of various digital audio formats. Audio data are carried between the audio processing unit 424 and the audio codec 426 via a communication link (not shown). The video and audio processing pipelines output data to an A/V (audio/video) port 428 for transmission to a television or other display. In the illustrated implementation, the video and audio processing components 420, 422, 424, 426 and 428 are mounted on the module 414.

FIG. 4 shows the module 414 including a USB host controller 430 and a network interface (NW I/F) 432, which may include wired and/or wireless components. The USB host controller 430 is shown in communication with the CPU 402 and the memory controller 403 via a bus (e.g., PCI bus) and serves as host for peripheral controllers 434. The network interface 432 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 4, the console 401 includes a controller support subassembly 440, for supporting four game controllers 441(1)-541(4). The controller support subassembly 440 includes any hardware and software components needed to support wired and/or wireless operation with an external control device, such as for example, a media and game controller. A front panel I/O subassembly 442 supports the multiple functionalities of a power button 443, an eject button 444, as well as any other buttons and any LEDs (light emitting diodes) or other indicators exposed on the outer surface of the console 401. The subassemblies 440 and 442 are in communication with the module 414 via one or more cable assemblies 446 or the like. In other implementations, the console 401 can include additional controller subassemblies. The illustrated implementation also shows an optical I/O interface 448 that is configured to send and receive signals (e.g., from a remote control 449) that can be communicated to the module 414.

Memory units (MUs) 450(1) and 450(2) are illustrated as being connectable to MU ports "A" 452(1) and "B" 452(2), respectively. Each MU 450 offers additional storage on which games, game parameters, and other data may be stored. In some implementations, the other data can include one or more of a digital game component, an executable gaming application, an instruction set for expanding a gaming application, and a media file. When inserted into the console 401, each MU 450 can be accessed by the memory controller 403.

A system power supply module 454 provides power to the components of the gaming system 400. A fan 456 cools the circuitry within the console 401.

An application 460 comprising machine instructions is typically stored on the hard disk drive 408. When the console 401 is powered on, various portions of the application 460 are loaded into the RAM 406, and/or the caches 410 and 412, for execution on the CPU 402. In general, the application 460 can include one or more program modules for performing various display functions, such as controlling dialog screens for presentation on a display (e.g., high definition monitor), controlling transactions based on user inputs and controlling data transmission and reception between the console 401 and externally connected devices.

The gaming system 400 may be operated as a standalone system by connecting the system to high definition monitor, a television, a video projector, or other display device. In this standalone mode, the gaming system 400 enables one or more players to play games, or enjoy digital media, e.g., by watching movies, or listening to music. However, with the integration of broadband connectivity made available through the network interface 432, gaming system 400 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor comprising,
    accessing personalization data,
    determining video clips based upon the personalization data and metadata associated with the video clips,
    generating transition content relevant to a first one of the video clips by:
        retrieving metadata associated with the first one of the video clips, the retrieved metadata being textually descriptive of content included in the first one of the video clips, and
        inserting the retrieved metadata, being textually descriptive of the content included in the first one of the video clips, into the transition content for display before the first one of the video clips is displayed, and
    generating for display the video clips and the transition content in a sequence for narrative presentation based upon the personalization data and at least some of the metadata, such that upon playing of the narrative presentation, the transition content is played before the first one of the video clips, and wherein the transition content includes for display the retrieved metadata associated with the first one of the video clips;
    determining, during playback of the narrative presentation, that an event has occurred;
    in response to the event occurring during the playback of the narrative presentation, dynamically reconfiguring the sequence of the video clips and the transition content in the narrative presentation; and
    in response to dynamically reconfiguring the sequence for narrative presentation, marking video clips in the sequence that have already been played during display of the narrative presentation as already played.

2. The method of claim 1 further comprising, arranging the video clips ordered according to the sequence and other content into the narrative presentation.

3. The method of claim 2 wherein arranging the video clips and other content into the narrative presentation comprises including transition content that upon playing of the narrative is played before at least one video clip.

4. The method of claim 2 wherein arranging the video clips and other content into the narrative presentation comprises including an advertisement that upon playing of the narrative is played in association with at least one video clip.

5. The method of claim 1 wherein determining the video clips based upon the personalization data and the metadata comprises querying for video clips associated with metadata that matches information corresponding to at least some of the personalization data.

6. The method of claim 1 wherein determining the video clips based upon the personalization data and the metadata comprises filtering a set of available video clips into a smaller subset.

7. The method of claim 1 wherein presenting the video clips in a sequence comprises determining scores for at least some of the video clips and ordering the video clips based upon the scores.

8. The method of claim 1 further comprising,
    arranging the video clips according to the sequence and other content into the narrative presentation,
    detecting interaction directed towards playing the narrative presentation, and playing at least part of the narrative presentation in response to detecting the interaction.

9. The method of claim 1, wherein the metadata associated with the first one of the video clips comprises at least one of: a title, a score of a sports game, statistics related to a sports team, sports standings, sports statistics, and a name of a celebrity.

10. A system comprising,
a filter set for determining a set of personalized video clips from a larger set of available video clips based upon at least some personalization data,
a content scoring component for determining scores for the set of personalized video clips,
a sorting component that orders the video clips,
a mechanism for generating other content relevant to a first one of the video clips by:
  retrieving metadata associated with the first one of the video clips, the retrieved metadata being textually descriptive of content included in the first one of the video clips, and
  inserting the retrieved metadata, being textually descriptive of the content included in the first one of the video clips, into the other content for display before the first one of the video clips is displayed, and
a mechanism that arranges the video clips and the other content into a narrative for playing by inserting the other content into the narrative, the other content comprising at least one of introductory content, transition content and ending content relevant to the first one of the video clips, wherein the other content is inserted such that upon playing of the narrative, the other content is played before the first one of the video clips, and wherein the other content includes for display the retrieved metadata associated with the first one of the video clips;
a mechanism for determining, during playback of the narrative, that an event has occurred;
a mechanism for, in response to the event occurring, during playback of the narrative, dynamically reconfiguring the arrangement of the video clips and the other content; and
a mechanism for, in response to dynamically reconfiguring the arrangement of the video clips, marking video clips in the arrangement that have already been played as already played.

11. The system of claim 10, wherein the filter set selects the set of personalized video clips based upon metadata.

12. The system of claim 10 further comprising a remote personalization service to allow access to the personalization data from a plurality of remote devices.

13. The system of claim 10 wherein the content scoring component further determines the scores based upon one or more criteria including at least one of popularity data, user behavior history data or state data.

14. The system of claim 10 wherein the personalization data comprises data related to sports, and wherein at least some of the personalized video clips comprise sports highlight clips.

15. The system of claim 10 wherein the other content comprises content that is superimposed around at least some of the set of personalized video clips.

16. The system of claim 10, wherein the metadata associated with the first one of the video clips comprises at least one of: a title, a score of a sports game, statistics related to a sports team, sports standings, sports statistics, and a name of a celebrity.

17. One or more computer-readable storage memory having computer-executable instructions, which when executed perform steps, comprising:
ordering information corresponding to a set of video clips into a catalog based upon personalization data corresponding to sports;
generating other sports content relevant to a first one of the video clips by:
  retrieving metadata associated with the first one of the video clips, the retrieved metadata being textually descriptive of content included in the first one of the video clips, and
  inserting the retrieved metadata, being textually descriptive of the content included in the first one of the video clips, into the other sports content for display before the first one of the video clips is displayed, and
arranging the catalog into a highlight reel based upon the ordering, including adding the other sports content relevant to the first one of the video clips to the highlight reel as transition content such that upon playing of the highlight reel, the other sports content is played before the first one of the video clips, and wherein the other sports content includes for display the retrieved metadata associated with the first one of the video clips;
playing at least part of the highlight reel, including playing at least the first one of the video clips;
determining, during playback of the highlight reel, that an event has occurred;
in response to the event occurring during playback of the highlight reel, dynamically reconfiguring the arrangement of the highlight reel including the other sports content; and
in response to dynamically reconfiguring the arrangement of the catalog, marking video clips in the catalog that have already been played as already played.

18. The one or more computer-readable storage memory of claim 17 wherein ordering the catalog comprises determining a score for each video clip, and sorting based upon the scores for the set of video clips.

19. The one or more computer-readable storage memory of claim 17 wherein arranging the catalog into a highlight reel comprises adding introductory content before a first video clip in the highlight reel, or adding transition content between at least two video clips in the highlight reel, or both adding introductory content before a first video clip in the highlight reel, or adding transition content between at least two video clips in the highlight reel.

20. The one or more computer-readable storage memory of claim 17, wherein the metadata associated with the first one of the video clips comprises at least one of: a title, a score of a sports game, statistics related to a sports team, sports standings, sports statistics, and a name of a celebrity.

* * * * *